United States Patent [19]

Smythe et al.

[11] 3,848,591
[45] Nov. 19, 1974

[54] ELECTRONICALLY-CONTROLLED GAS PRESSURE METER

[75] Inventors: George Edward Smythe; Geoffrey Keith Orton, both of London, England

[73] Assignee: U.S. Phillips Corporation, New York, N.Y.

[22] Filed: Oct. 13, 1972

[21] Appl. No.: 297,187

[30] Foreign Application Priority Data
Nov. 2, 1971    Great Britain..................... 50799/71

[52] U.S. Cl......... 128/145.8, 128/2.08, 128/DIG 29
[51] Int. Cl.............................................. A62b 7/00
[58] Field of Search........... 128/145.8, 145.5, 145.6, 128/142.2, 142, 2.08, 2.07, 2 R, 2.1 R, DIG. 17, 2.05 R, DIG. 29; 73/223, 194 E; 340/279

[56] References Cited
UNITED STATES PATENTS

| | | | |
|---|---|---|---|
| 2,907,320 | 10/1959 | Weese et al. | 128/2 R |
| 3,324,848 | 6/1967 | Domeier et al. | 128/2.08 |
| 3,414,896 | 12/1968 | Glick et al. | 128/145.5 X |
| 3,433,217 | 3/1969 | Rieke | 128/2.08 |
| 3,511,237 | 5/1970 | Jaeger | 128/2.08 |
| 3,536,062 | 10/1970 | Horn | 128/2.05 R |
| 3,545,429 | 12/1970 | Pelta | 128/2.1 R |
| 3,572,317 | 3/1971 | Wade | 128/2.1 R |
| 3,605,729 | 9/1971 | Liv et al. | 128/2.08 |
| 3,611,178 | 10/1971 | McConnell | 128/DIG.17 X |
| 3,611,801 | 10/1971 | Paine | 128/2.08 |
| 3,726,271 | 4/1973 | Mondshine et al. | 128/2.08 |

FOREIGN PATENTS OR APPLICATIONS

| | | | |
|---|---|---|---|
| 1,329,885 | 5/1963 | France | 128/2.08 |
| 1,563,125 | 4/1969 | France | 128/2.08 |

OTHER PUBLICATIONS

Ohl, R. "Ventitrol, Apparatus for Measurement of Mean Volume per Unit Time," Proceedings of the 1 Nordic Meeting on Med. and Biol. Eng., Otaniemi, Finland (15–18 Jan. 1970) pp. 35–37.

Primary Examiner—Richard A. Gaudet
Assistant Examiner—Lee S. Cohen
Attorney, Agent, or Firm—Frank R. Trifari; Bernard Franzblau

[57] ABSTRACT

Apparatus for monitoring lung gas pressure includes a pressure transducer that controls the frequency of a variable oscillator as a function of the gas pressure. The frequency signal is converted into a proportional analog signal which in turn is integrated to provide an output signal indicative of the mean value of the gas pressure. An indicator responds to the output signal to provide an indication of the mean gas pressure.

7 Claims, 5 Drawing Figures

ELECTRONICALLY-CONTROLLED GAS PRESSURE METER

The invention relates to a medical respirator provided with a gas pressure meter suitable for monitoring the gas pressure in a patient's lungs during ventilation of the patient by means of the medical respirator.

The principal object of the invention is the provision of a gas pressure meter which measures and accurately follows changes in gas pressure.

An electronically-controlled gas pressure meter according to the invention is characterized in that the pressure meter includes a pressure transducer, a first oscillator which is coupled to the transducer and the oscillation frequency of which depends upon the instantaneous value of the output signal from the transducer, a second oscillator of fixed frequency, a mixer circuit the output signal from which has a frequency which is equal to the difference frequency of the two oscillator frequencies, a digital-to-analogue converter for providing an analogue signal proportional to the difference frequency, and a visual pressure indicator the indication of which is proportional to the analogue signal.

An embodiment of the invention which proved highly satisfactory in practice, especially in respect of the linear relationship between gas pressure and output signal, the sensitivity of the transducer and also in respect of cost and strength, is characterized in that the pressure transducer is a pressure-sensitive capacitor which comprises a metal aneroid capsule which has a part which is movable as a function of the gas pressure prevailing in it and forms a first plate of the capacitor, and a plate which is fixedly arranged opposite the movable plate.

In this embodiment the satisfactory linearity of the pressure transducer is related to the deformation of the upper surface of the metal capsule which serves as the movable capacitor plate, which deformation is produced by a change in the gas pressure in the capsule.

In a preferred embodiment of the invention the gas pressure meter according to the invention additionally or alternatively provides an indication of the mean gas pressure. This embodiment is characterized in that the signal output of the digital-to-analogue converter is connected to an integrator which provides a signal which corresponds to the mean gas pressure, the signal output of the integrator being connected to the said visual pressure indicator or to a second such indicator.

Gas pressure will hereinafter be referred to in terms of centimeters of water as measured on a water gauge. Thus atmospheric pressure is referred to as zero pressure, lower-than-atmospheric pressure as negative pressure, and higher-than-atmospheric pressure as positive pressure.

The feature of providing an indication of the mean pressure is particularly useful in a method of medical ventilation in which alternative positive and negative pressures are applied to inflate and deflate the lungs. Over a period of several respirations, of course, the mean pressure should be zero. If the mean pressure goes positive or negative, this can represent a danger condition. Thus, for example, too high a mean positive pressure indicates that the patient is not getting sufficient air out of his lungs, i.e. he is being steadily overinflated. The opposite applies, of course, for a negative mean pressure.

A further embodiment of the invention is characterized in that the signal output of the digital-to-analogue converter is connected to an alarm circuit for an alarm signal when the value of the output signal from the converter becomes too low and/or too high.

The various features and advantages of the present invention will be apparent from the following description of an exemplary embodiment thereof, taken in conjunction with the accompanying drawings, in which.

Figure 1A:
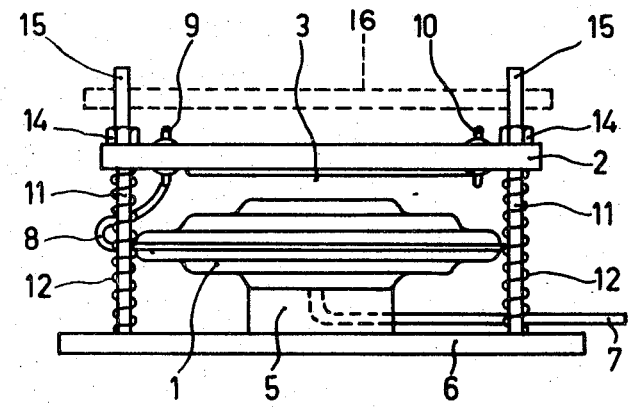
FIG. 1 shows a pressure-sensitive capacitor.
Figure 1B:
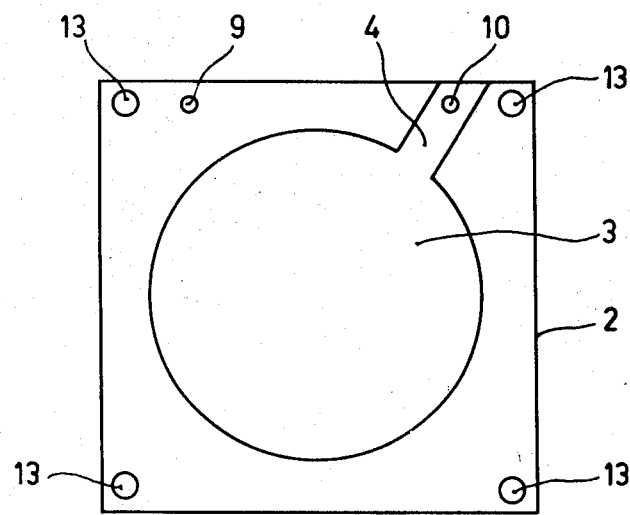

Referring now to FIG. 1 (a) of the drawings, a pressure-sensitive capacitor suitable for use in a respirator according to the invention comprises a metal aneroid capsule 1 of well-known configuration and an insulating board 2 having a thin electrically-conducting film 3 on its lower face. Conveniently, the board 2 and film 3 are formed from a standard insulating board having a thin copper laminate fixed to one surface. Such boards are well known and are used in the manufacture of printed circuit boards. A plan view of the underface of the board 2, showing the configuration of the conducting film, is given in FIG. 1(b) from which it can be seen that the film is in the form of a circular disk having an extension portion 4 which serves as a terminal point for making electrical connection to the film. This film serves as one electrode of the capacitor.

The metal capsule 1 (FIG. 1(a)) is fixed at its lowermost face to a supporting block 5 mounted on a baseplate 6. A pipeline 7, feeds the gas, the pressure of which is to be determined, to the capsule 1. The pipeline is partially housed in block 5.

Electrical connection is made to the capsule 1 via a lead 8 connected, for example, by soldering, to capsule 1 and to a terminal 9 accommodated in the board 2. The upper face of capsule 1 forms the second electrode of the capacitor. A further terminal 10 is provided for making electrical connection to the film electrode 3.

Four threaded studs 11 are fixed at one end into the baseplate 6 and each is surrounded by a compressed helical spring 12. Board 2 is located over the studs by means of four holes 13 (FIG. 1(b)) and is held in position by the upward force of springs 12 pressing it against nuts 14. These nuts are adjusted, with pipeline 7 open to the atmosphere, so as to obtain the required spacing between the electrode formed by film 3 and the upper surface of capsule 1 and, hence, the required nominal capacitance value between terminals 9 and 10 representing atmospheric pressure. When the required adjustment has been obtained, the nuts are locked in position — for example by the application of locking varnish to each.

Threaded studs 11 have extensions 15 on which a printed circuit 16, shown dotted, may be located.

This circuit board accommodates the associated electronic circuitry of the pressure meter, or at least at the two oscillators thereof.

The use of a standard aneroid capsule as one electrode of the pressure-sensitive capacitor is particularly advantageous in that such capsules are readily available, are very robust and reliable, and are relatively cheap. A further advantage is that, to a first order approximation, the variation of capacitance with applied pressure is fairly linear with the result that, although some linearising correction is applied — as will be described later — this is achieved very simply. The reason that the device is reasonably linear is that the capacitance varies inversely with the square of the distance apart of its two electrodes (i.e. the capacitance increases more rapidly as the distance decreases), whereas the movement of the upper face of the capsule decreases with increased pressure.

Figure 2:
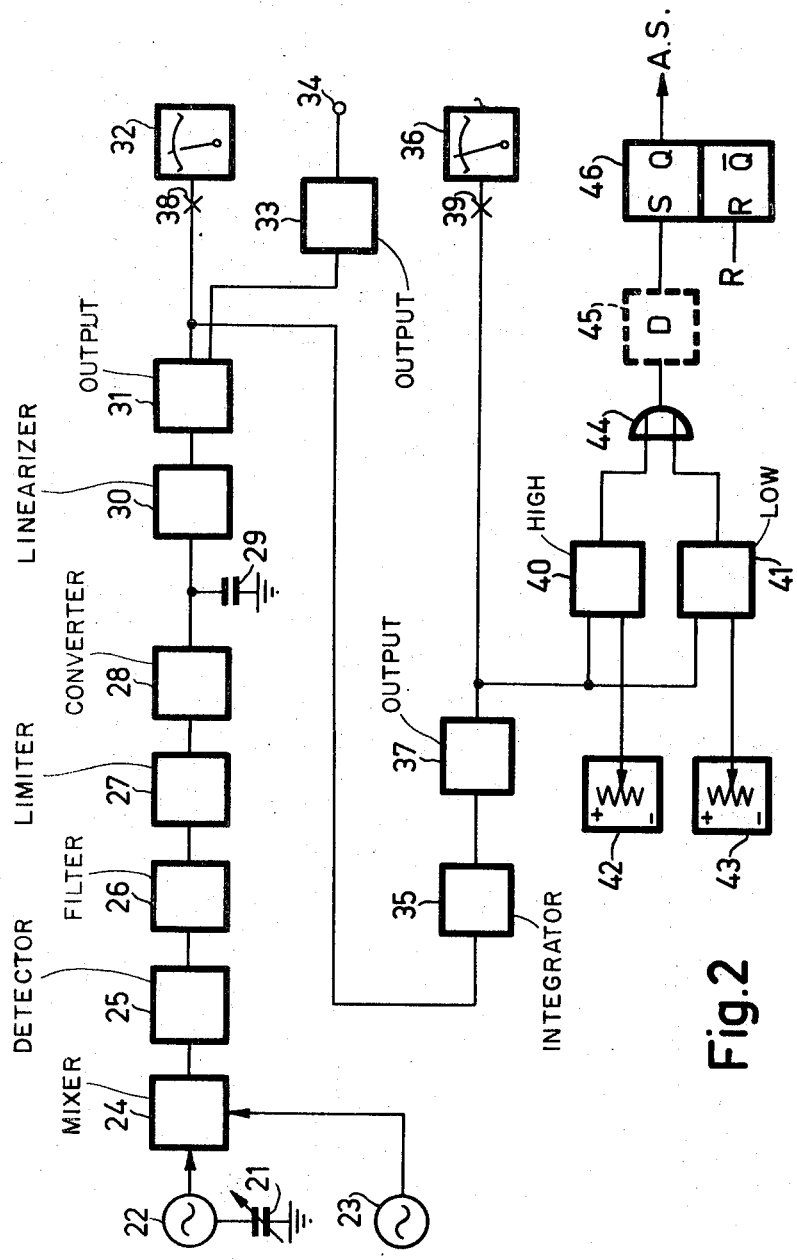
FIG. 2 is a block schematic diagram of an electronically-controlled gas pressure meter.

Referring now to FIG. 2 of the drawings, which shows a block schematic circuit diagram of a pressure meter according to the invention, a pressure-sensitive capacitor 21, such as that already described, controls the frequency of a first oscillator 22. The output of this oscillator is combined with the output of a second fixed frequency oscillator 23 in a mixer circuit 24. The output of mixer 24 is detected by a detector 25 and fed to a low pass filter 26, the output of which is the difference frequency of the two oscillators. The filter output is squared by a limiter 27 and fed to a frequency-to-analogue signal converter 28 which conveniently has the form of the well-known "pump" circuit which pumps the squared current pulses into a capacitor 29, the analogue signal thus appearing across the terminals of this capacitor. The analogue signal is then fed, via a correction circuit 30 which linearises the pressure/analogue signal relationship, to an output circuit 31 and thence to a visual indicator 32, such as a current meter, calibrated in terms of instantaneous pressure. When the pressure meter is used in conjunction with a medical respirator (the pipeline 7 then being connected to the Y-piece of the patient's facemask) the calibrated scale range may, for example, be from −20 to +100 centimetres of water.

The use of two oscillators, 22 and 23, mounted adjacent one another, renders the pressure meter according to the invention insensitive to changes in ambient temperature and ageing effects. Since the response of the electronic circuitry to changes in pressure is virtually instantaneous, the indicator 32 indicates the instantaneous pressure.

In order to allow the instantaneous pressure measured by the pressure meter to be continuously recorded, a further output signal from output circuit 31 is passed through a further output stage 33 the output of which is available at terminal 34.

To derive an indication of the mean of the pressures measured over a period by the pressure meter so far described, the output of output circuit 31, feeding the indicator 32, is passed through an integrator 35 comprising a low pass filter having a long time constant, for example, 15 seconds, and thence to a visual indicator 36 via a suitable output buffer circuit 37.

Conveniently, indicators 32 and 36 may be a single indicator switched to output circuit 31 (instantaneous pressure) or to output circuit 37 (mean pressure) by means of a changeover key contact wired to points 38 and 39 of the circuit.

As previously mentioned, it is particularly useful in medical applications to provide a visual and/or audible alarm if the mean pressure becomes excessively positive or negative. To achieve this, an alarm circuit may be provided which derives its input from the mean pressure output signal of output circuit 37. Such "high and low" alarm circuits are well-known per se. A convenient circuit is shown in FIG. 2 and comprises high and low comparators 40 and 41 each having a presettable trigger level control 42 and 43, respectively. Each trigger level control conveniently comprises a potentiometer connected to a voltage source in order to provide a preset voltage at one input of its associated comparator circuit. The respective voltages are adjusted by the potentiometer, calibrated in terms of pressure, to the values of the signals appearing at the output of circuit 37 which are representative of the high and low pressure alarm values. Each comparator gives a logic 1 output if the input voltage from circuit 37 reaches the voltage set by its associated potentiometer. These 1 outputs are combined in an OR gate 44 and passed, via an optional time delay 45, to a bistable trigger device 46 (such as a set-reset flip flop). This trigger device gives a 1 output signal at its Q output if an alarm signal is received at its S (set) input, this output being used to operate a visual and/or audible alarm. This signal is then continuous, irrespective of the S input condition, until the bistable device is reset by a momentary signal, e.g. from a "Reset" key at its R (reset) input.

All the circuits represented by the circuit blocks in FIG. 2 are conventional and are well-known per se. A fully detailed circuit of a practical embodiment is, however, shown in FIGS. 3 and 4. The operation of this circuit will be obvious, having regard to the block schematic diagram of FIG. 2, to those skilled in the art, but a brief description will now be given. For convenience, the circuit is divided into the blocks shown in FIG. 2 and numbered accordingly.

Figure 3:
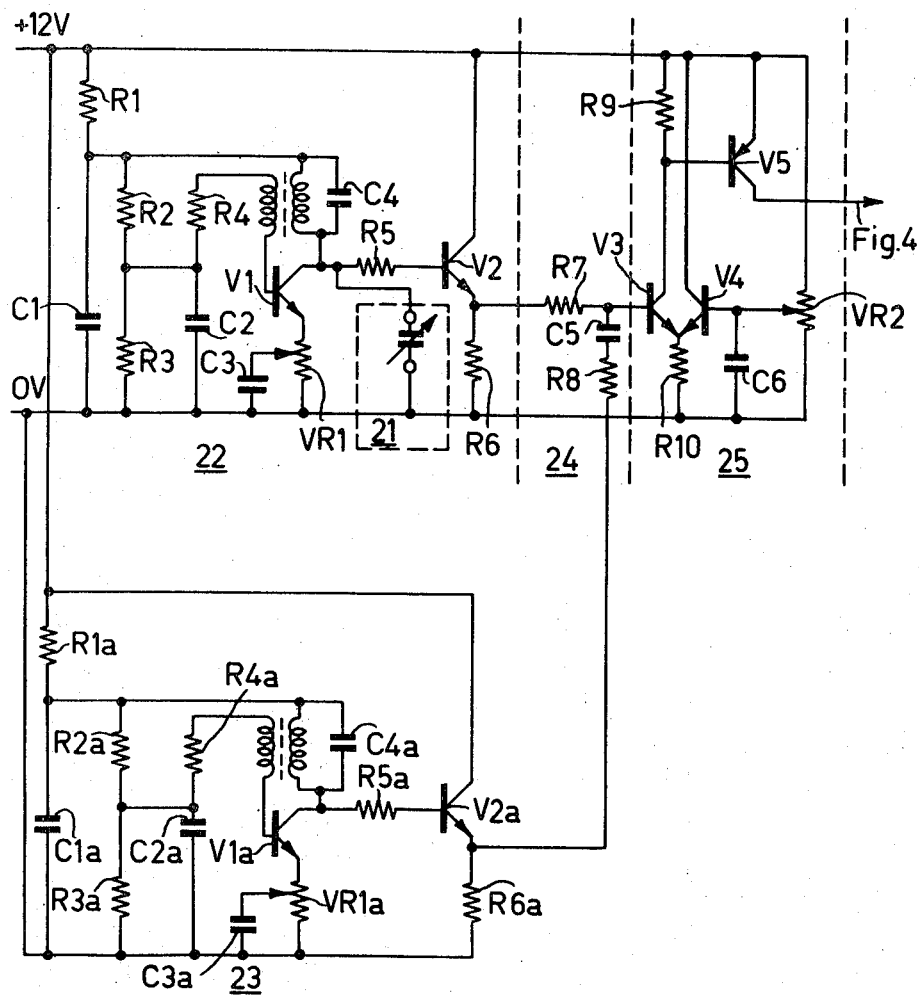
FIGS. 3 and 4 show a detailed circuit of the pressure meter shown in FIG. 2.

Referring first to FIG. 3, the two oscillators 22 and 23 are identical tuned-collector oscillators of simple form, each having a frequency in the order of 1MHz. Oscillator 22 has the pressure-sensitive capacitor 21 connected to its tuned-collector circuit, as shown. The oscillators have their d.c. supplies isolated from each other by individual R-C networks R1, C1 and R1a, C1a. R2 and R3 derive the base bias current for transistor V1, R3 being bypassed by C2. Potentiometer VR1 is a preset gain control. Each oscillator is provided with an emitter-follower output buffer stage comprising transistor V2.

The outputs from oscillators 22 and 23 are combined in the mixer stage 24 comprising R7, R8 and C5. Detector 25 is formed by a long-tailed pair comprising transistors V3 and V4, the detection level being set by adjustment of voltage-dividing potentiometer VR2. The detected signal is taken from the collector load R9 of transistor V3 via transistor V5.

Preferably, in the practical embodiment, at least the electronic circuitry shown in FIG. 3 is accommodated on the printed circuit wiring board shown dotted in FIG. 1(a), transistors V1 and V1a being mounted in a common heat sink to reduce relative temperature drift to a minimum.

Figure 4:
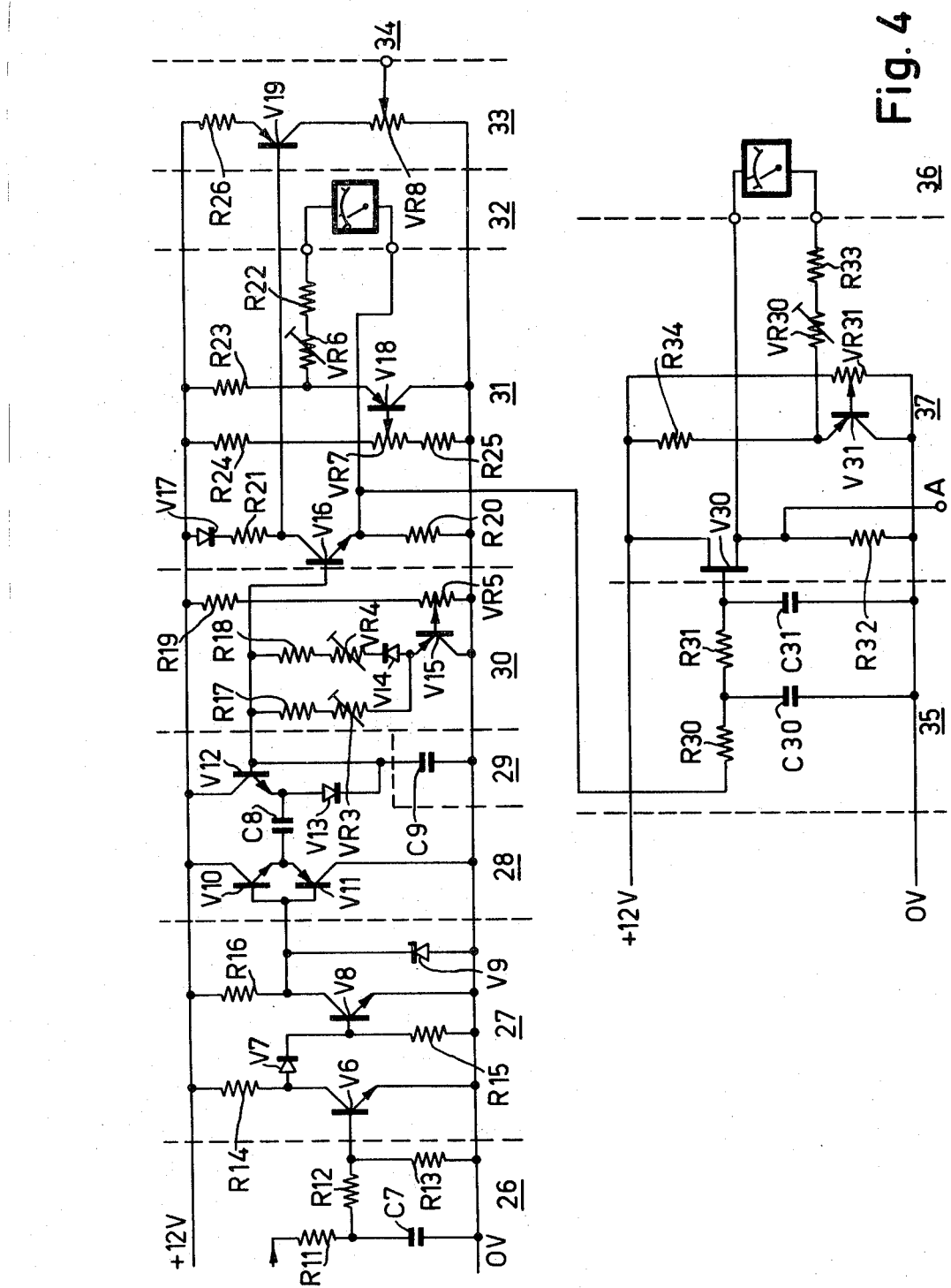

The detector output is fed, see FIG. 4, via R11 to the low pass filter 26 comprising R12 and C7, and thence to the input buffer transistor V6 of squaring circuit 27. The limiting of the signal is effected by Zener diode V9 connected to the collector of transistor V8. The square signal is then fed to an input of the push-all pair of transistors V10, V11 which, in turn, drives a transistor pump comprising capacitors C8 and C9, transistor V12, and a diode V13. The transistor pump charges capacitor C9 to a voltage level dependent upon the input frequency to give an analogue signal output. This analogue signal is corrected by correction circuit 30 to produce an analogue signal voltage proportional to the input frequency. The correction is effected by resistors R18, VR4 in series with Zener diode V14 in parallel with the output load (resistors R17 plus VR3) of the pump transistor V12. This correction is necessary because the pressure sensitive capacitor has an inverse law which, although corrected to a certain extent by the top of the capsule deforming as it expands, is still non-linear and also because the capacitor to frequency ratio is also non-linear. Transistor V15 and preset potentiometer VR5 effect zero correction of the visual indicator, both for instantaneous and mean pressures, by adjusting the overall signal level at the input to the output circuit 31.

Output circuit 31 comprises an emitter-follower transistor V16 which prevents loading of the pump circuit. Preset resistor VR6 provides adjustment for the full-scale deflection of visual indicator 32, and transistor V18 and resistor VR7 provide a zero adjustment for instantaneous pressure only. An output is taken from the collector of V16 to transistor V19 of analogue output circuit 33. An analogue signal output, suitable for driving a recording device, is available at terminal 34 and potentiometer VR8 is adjustable so that the output analogue signal, over the pressure range to be measured, is in the range 0 to 1V.

An indication of the mean pressure is obtained by integrating the output signal to the visual indicator in a low pass filter 35 comprising resistors R30, R31 and capacitors C30, C31. The filter feeds an output circuit 37 comprising a field effect transistor V30 which has a very high input impedance and so does not load the filter. The output voltage of V30 is proportional to the mean pressure and drives the visual indicator 36. This output may also be used to drive the high-low alarm circuits previously described. Potentiometers VR30 and VR31 adjust the full scale and zero deflections, respectively, of indicator 36 for mean pressure.

As described in relation to FIG. 2, a single visual indicator may be used instead of the two shown, a changeover key being provided to switch the meter between output circuits 31 and 37 according to whether an indication of instantaneous or mean pressure is required at a particular instant.

In the use of medical respirators using automatically timed inspiratory and expiratory periods, it is sometimes useful to know if a patient tries to draw breath voluntarily, particularly if the respirator is on the expiratory period. Our copending Application Ser. No. 282,587 discloses a medical respirator in which, on receipt of a trigger signal during an expiratory period indicating that the patient has tried to take a voluntary breath, the respirator cycle is immediately switched to the inspiratory period to assist the patient to draw breath. Such a signal can be derived from the collector of V19 in the analogue signal output circuit 33. This output can be fed to a "low" alarm device formed, for example, in the same manner as the high-low alarm circuitry described in relation to FIG. 2. The preset level in this case is considerably lower than that set for the negative pressure alarm of FIG. 2 since the airway pressure is already negative (gas being drawn from the patient's lungs during an expiratory period) when the patient draws breath and, hence, drives the pressure even more negative.

Atlhough the pressure meter according to the invention has been described in the embodiment as using a particularly advantageous form of pressure-sensitive capacitor, the invention is not so limited since, of course, other types of pressure transducers may be used. In this event, the correction circuit 30 must be modified to suit the characteristic pressure/capacity curve of the capacitor concerned.

What is claimed is:

1. A gas pressure meter suitable for monitoring the gas pressure in a patient's lungs during ventilation of the patient by means of a medical respirator comprising, a pressure transducer for converting said gas pressure into an equivalent electric parameter, a gas tube coupled thereto, a first oscillator which is connected to the transducer so that the oscillation frequency thereof depends upon the instantaneous value of the transducer output, a second oscillator of fixed frequency, mixer circuit means coupled to said first and second oscillators to derive an output signal having a frequency which is equal to the difference frequency of the oscillator frequencies, a frequency-to analogue converter coupled to the mixer output for providing an analogue signal proportional to the difference frequency, an integrator, means for applying said analogue signal to the integrator which provides an output signal indicative of the mean value of the gas pressure, and visual pressure indicator means for providing an indication of the analogue signal and of said output signal.

2. A pressure meter as claimed in claim 1 wherein the pressure transducer comprises a pressure-sensitive capacitor which comprises a metal aneroid capsule which has a part which is movable as a function of the gas pressure prevailing in it and forms a first conductive plate of the capacitor, and a second conductive capacitor plate which is fixedly arranged externally of the capsule and opposite the movable plate.

3. A pressure meter as claimed in claim 1, further comprising first and second comparators connected to the output of the integrator, means for supplying to said first and second comparators first and second reference signals, respectively, that indicate the maximum and minimum safe values of lung gas pressure, respectively, alarm circuit means, and means connecting the output terminals of said comparators to said alarm circuit for giving an alarm signal when the value of the output signal from the integrator becomes too low or too high.

4. A pressure meter as claimed in claim 1 further comprising linearizing correction circuit means coupled between the output of the converter and the input to the integrator for linearizing the variation of said analogue signal as a function of the gas pressure applied to the transducer.

5. A pressure meter as claimed in claim 1 wherein the pressure transducer comprises a pressure-sensitive capacitor which converts a variation in gas pressure into a proportional variation in capacitance, the capacitance of said capacitor being operative to control the oscillation frequency of the first oscillator.

6. A device for measuring the gas pressure in a respiratory system under control of a respirator comprising, ventilation means for forcing gas into and out of said respiratory system, a pressure transducer for converting gas pressure into a proportional electric parameter, a tube coupling the pressure transducer to said respiratory system via the ventilation means, a first oscillator, means connecting the transducer to said first oscillator so that the electric parameter variations of the transducer control the oscillator oscillation frequency, a second fixed frequency oscillator, mixer circuit means coupled to said first and second oscillators to derive an output signal of a frequency equal to the difference frequency of the oscillator frequencies, a frequency-to analogue signal proportional to the difference frequency, an integrator, means for applying said analogue signal to the integrator which provides an output signal indicative of the mean value of the gas pressure, and visual pressure indicator means for providing an indication of said integrator output signal.

7. A device as claimed in claim 6 wherein the pressure transducer comprises a pressure-sensitive capacitor for converting a variation in gas pressure into a variation in capacitance, said device further comprising linearizing correction circuit means coupled between the output of the converter and the input to the integrator for linearizing the variation of said analogue signal as a function of the gas pressure applied to the transducer.

* * * * *